United States Patent [19]

Katori et al.

[11] 4,045,368

[45] * Aug. 30, 1977

[54] PROCESS FOR PRODUCTION OF ACTIVATED CARBON SPHERES

[75] Inventors: Kunihiko Katori, Tokyo; Hiroshi Nagai, Chofu; Zenya Shiiki, Tokyo, all of Japan

[73] Assignees: Kureha Kagaku Kogyo Kabushiki Kaisha, Tokyo; Toyo Boseki Kabushiki Kaisha, Osaka, both of Japan

[*] Notice: The portion of the term of this patent subsequent to Sept. 30, 1992, has been disclaimed.

[21] Appl. No.: 518,084

[22] Filed: Oct. 25, 1974

[30] Foreign Application Priority Data

Oct. 29, 1973 Japan .................................. 48-120653

[51] Int. Cl.$^2$ ............................................. B01J 37/00
[52] U.S. Cl. .................................... 252/421; 252/422; 252/426; 252/438; 252/444; 252/445
[58] Field of Search ............... 252/421, 422, 426, 438, 252/444, 445

[56] References Cited

U.S. PATENT DOCUMENTS

| | | | |
|---|---|---|---|
| 1,641,053 | 8/1927 | Sauer | 252/421 |
| 2,867,540 | 1/1959 | Harris | 106/307 |
| 3,053,775 | 9/1962 | Abbott | 252/422 |
| 3,317,339 | 5/1967 | Fortner et al. | 427/223 |
| 3,623,999 | 11/1971 | Juntgen et al. | 252/421 |
| 3,776,829 | 12/1973 | Goan | 423/447 |
| 3,909,449 | 9/1975 | Nagai et al. | 252/422 |
| 3,917,806 | 11/1975 | Amagi et al. | 252/444 |

*Primary Examiner*—Winston A. Douglas
*Assistant Examiner*—John P. Sheehan
*Attorney, Agent, or Firm*—Lane, Aitken, Dunner & Ziems

[57] ABSTRACT

Microporous pitch spheres prepared from pitch are oxidized at a temperature of from 100° C to 500° C in an atmosphere of an oxidative gas to produce pitch spheres containing not less than 10% by weight of combined oxygen. Then the combined oxygen-containing pitch spheres are heated at a temperature of from 150° C to 700° C in an atmosphere of ammonia gas to produce pitch spheres containing not less than 1.5% by weight combined nitrogen. The resultant pitch spheres are subsequently activated by a conventional method to produce activated carbon spheres containing more than 1% by weight of combined nitrogen.

6 Claims, No Drawings

PROCESS FOR PRODUCTION OF ACTIVATED CARBON SPHERES

FIELD OF THE INVENTION

This invention relates to a process for producing activated carbon spheres of high quality from microporous pitch spheres.

BACKGROUND OF THE INVENTION

In recent years, the practice of treating the exhaust gas from a combustion furnace with activated carbon has become a popular measure for preventing the public nuisance otherwise caused when exhaust gas containing oxides of sulfur and oxides of nitrogen is released into the atmosphere. Activated carbon is widely used to remove sulfur dioxide from exhaust gas. The activated carbon which has heretofore been used for the desulfurization of exhaust gas is generally a product obtained by forming powdered coal into spheres and is deficient in mechanical strength and susceptible to disintegration. Furthermore, the prior art activated carbon is unsatisfactory in its ability to adsorb sulfur dioxide. Accordingly, a large amount of the prior art adsorbent must be used to effect the desired desulfurization and consequently the size of the sulfur dioxide adsorption tower holding the adsorbent must be large in size.

Consequently, a need exists for an activated carbon having high mechanical strength and excellent $SO_2$ and $NO_x$ adsorbing capability.

SUMMARY OF THE INVENTION

It is, therefore, an object of this invention to provide a process for the production of an activated carbon which enjoys excellent properties such as high gas adsorbing capability and at the same time exhibits high mechanical strength. Other objects of this invention will become apparent from the following description of the invention.

It has now been discovered that an activated carbon possessing the desired degree of mechanical strength and gas adsorbing capability is obtained by melting and mixing pitch with a proper aromatic solvent, shaping the molten mixture into the form of spheres, extracting the aromatic solvent from the resultant spheres to produce microporous pitch spheres, oxidizing the microporous pitch spheres in an atmosphere of an oxidative gas, then subjecting the oxidized pitch spheres to a heat treatment in an atmosphere of ammonia gas to produce pitch spheres combined with not less than 1.5% by weight of nitrogen and thereafter activating the pitch spheres. Thus, the present invention is characterized by the steps of oxidizing the microporous pitch spheres prepared as described above at a temperature of from 100° C to 500° C in an atmosphere of an oxidative gas to produce pitch spheres containing not less than 10% by weight of combined oxygen, then heating the pitch spheres containing at least 10% by weight of combined oxygen at a temperature of from 150° C to 700° C in an atmosphere of ammonia gas to produce pitch spheres combined with not less than 1.5% by weight of nitrogen and thereafter activating the nitrogencontaining pitch spheres.

DETAILED DESCRIPTION OF THE INVENTION

The microporous pitch spheres used as the raw material for the production of activated carbon spheres of the present invention are prepared from pitch. The pitch used in the preparation may be of any petroleum or coal origin. A pitch of a grade having a low softening point or a high hydrogen content is undesirable, because the pitch spheres may show mutual fusion or effervescence in the course of oxidation. The pitch to be used for the present invention should preferably have a softening point above 100° C, preferably in the range of from 100° to 250° C, a H/C (atomic ratio) below 1, preferably in the range of from 0.2 to 1.0 and a nitrobenzene insoluble content below 25% by weight. Pitches satisfying these requirements are obtained by subjecting petroleum hydrocarbons such as crude petroleum, asphalt, heavy oil, light oil, kerosene and naphtha to a heat treatment at a temperature of from 400° C to 2000° C for 0.001 to 2 seconds to produce tarry substances and then removing the low molecular components by distillation or extraction. Similar pitches may also be obtained by subjecting coal tars to a suitable heat treatment and thereafter removing low molecular components therefrom. A suitable pitch may also be obtained by modifying the waste pitch by-product from the refining of petroleum by an additional heat treatment or oxidating treatment. It should be noted that these pitches have heretofore been regarded as wastes and have found only limited utility as fuel. Accordingly, the present invention provides a significant contributes to the full utilization of natural resources.

The aromatic solvent added to the pitch in the preparation of pitch spheres must be compatible with the pitch and should preferably have a boiling point in the range of from 70 to 250° C. Suitable aromatic solvents satisfying these requirements include benzene, toluene, xylene, naphthalene, tetralin and methyl naphthalene. Industrial grade naphthalene or a petroleum fraction containing naphthalene or a BTX fraction is preferred for use as the aromatic solvent.

The procedure for preparation of the microporous spheres which are the raw material for the product of this invention is described below.

1. Mixing the aromatic solvent with the pitch and melting the mixture:

The pitch and the aromatic solvent are mixed with heating. The aromatic solvent is added in an amount of 10 to 50 parts by weight to each 100 parts by weight of the pitch. When the mixing ratio falls outside of this range, the activated carbon spheres will not acquire desired properties. The mixing of the pitch and the aromatic solvent may effected by means of an autoclave fitted with stirring vanes or a closed kneader. Generally, the temperature at which they are melted and mixed will preferably fall in the range of from 100 to 200° C.

2. Shaping the molten mixture into the form of spheres:

Any method may be used for shaping the above-described molten mixture into the form of spheres. As disclosed in O.L.S. 2,202,174, for example, the molten mixture is dispersed in an aqueous dispersion medium under atmosphere pressure or above and at a temperature of from 50° to 350° C. The dispersion medium contains, as a suspending agent, one or more water-soluble high molecular compounds selected from partially saponified polyvinyl acetate, polyvinyl alcohol, methyl cellulose, carboxymethyl cellulose, polyacrylic acid and salts thereof, polyethylene glycol and ether derivatives and ester derivatives thereof, starch and gelatin. The spheres are subsequently solidified by cooling. It is also possible to produce spheres by introducing the molten mixture dropwise into a suitable liquid such as water. The spheres can also be produced by casting the molten mixture into cavities of the desired size in a metal mold and allowing the mixture to cool for solidification. From the practical point of view, the particle diameter of the individual spheres should preferably be in the range of from 0.1 to 10 mm to enable thorough removal of the aromatic solvent.

3. Extraction of the aromatic solvent from the spheres:

The aromatic solvent contained in the shaped spheres is extracted and removed by immersing the spheres in an extractant which is an organic solvent which is compatible with the aromatic solvent contained in the spheres but which lacks affinity for the pitch. Organic solvents which are suitable for this extraction include aliphatic alcohols such as methanol, ethanol and propanol and paraffinic hydrocarbons such as hexane, heptane, gasoline and light naphtha. The most preferred extractant is solvent naphtha. Extraction of the aromatic solvent from the spheres with organic solvent extractant can effectively be achieved placing the spheres in the extractant at normal room temperature and thereafter allowing the spheres and the extractant to stand at rest, shaking them simultaneously or circulating the extractant through the spheres. Microporous pitch spheres are obtained by separating the from the spheres.

OXIDATION

In this step, the microporous pitch spheres which are obtained after the removal of the aromatic solvent as described above are oxidized at a temperature of from 100° C to 500° C in an atmosphere of an oxidative gas to produce pitch spheres containing not less than 10% by weight of combined oxygen. The term "combined oxygen" as used herein means that the oxygen atoms introduced into the pitch are bonded fast to the pitch chiefly in the form of such chemical groups such as aromatic ketone, lactone, alcohol, aldehyde, acid anhydride, carboxylic acid and furan ring, and the like. This combined oxygen will, in the subsequent ammonia treatment, serve to attach the nitrogen atoms to the pitch. The aforementioned chemical groups in the oxidized microporous pitch readily react with ammonia ($NH_3$). If the content of the combined oxygen is less than 10% by weight, however, then only a small amount of nitrogen will attach to the pitch in the ammonia treatment and the greater part of the ammonia will be lost by self-decomposition. Thus, in order to obtain the activated carbon spheres of the present invention, it is essential that the content of the combined oxygen be at least 10% by weight, preferably 15% or more by weight. If the temperature for this step is lower than 100° C, the oxidation reaction does not proceed satisfactorily. If it exceeds the upper limit of 500° C, effective incorporation of nitrogen into the spheres is not achieved even when the content of the combined oxygen is above the lower limit, 10% by weight. Thus, the temperature at which the oxidation is performed is required to fall within the range of from 100° C to 500° C, preferably from 100° C to 400° C. In the oxidation step, the softening point of the pitch spheres rises in proportion to the extent of the oxidation reaction. It is, therefore, desirable for the temperature of the oxidizing atmosphere to be gradually increased. This gradual increase of heat is also effective in avoiding cohesion of the individual pitch spheres. If the highest temperature reached during the oxidation treatment is above 200° C, preferably in the range of from 250° C to 350° C, then incorporation of at least 10% by weight of combined oxygen to the pitch can readily be achieved. Any oxygen-containing gas may be used. Suitable oxidizing gases include air and gas mixtures containing oxygen and an inert gas. The oxygen concentration in such an oxygen-containing gas is preferably in the range of 5 to 30% by volume. If the oxygen concentration is less than the lower limit of 5%, then the oxidation reaction performed to effect incorporation of at least 10% by weight combined oxygen must be continued for a longer time. If the oxygen concentration exceeds the upper limit of 30%, then the oxidation reaction becomes uncontrolable.

The apparatus for the oxidation reaction may be a heating device such as a rotary kiln, a fluidized-bed type device or a moving-bed type device, for example. To ensure the required incorporation of at least 10% by weight combined oxygen into the pitch spheres, it is essential that the behavior of the pitch as raw material, the particle diameter of individual microporous pitch spheres, the composition of the oxidative gas, the flow volume of the oxidative gas, the rate of temperature increase, and the type of the particular reaction apparatus used, all be properly selected. The pitch spheres containing at least 10% by weight of combined oxygen, obtained as described above, have been infusibilized.

HEAT TREATMENT IN AN ATMOSPHERE OF AMMONIA

In this step, the pitch spheres which contain at least 10% by weight combined oxygen are heated at a temperature of 150° C to 700° C in an atmosphere of ammonia gas to absorb at least 1.5% by weight of nitrogen. As already explained with regard to the aforementioned step of oxidation, the ammonia reacts with the pitch spheres through the combined oxygen so that nitrogen from the ammonia is chemically bound fast to the pitch in the form of chemical groups such as imide, amide, urethane, cyano group, azo group, pyridine ring or pyrone ring. The nitrogen which is bound in this manner to the spheres goes through the subsequent step of activation without appreciable removal and therefore remains in the finally produced activated carbon spheres. To obtain activated carbon spheres having the desired properties, it is necessary that the amount nitrogen to bound fast to the pitch, by the reaction with ammonia, be at least 1.5% by weight, preferably above 2% by weight. Although pure ammonia gas is advantageously used as the gas in the ammonia treatment step, a gas mixture, obtained by diluting pure ammonia gas with an inert gas, may alternatively be used. Pure ammonia gas or a mixed gas consisting of pure ammonia gas and an inert gas may be used in combination with not more than 50% by volume of one member or a mixture of two or more members selected from the group consisting of steam, air, oxygen, nitrogen and carbon dioxide. In the gas used for the ammonia treatment, the ammonia concentration should exceed 5% by volume, preferably 10% by volume. If the gas to be used for the ammonia treatment contains an oxidative gas such as oxygen or air, care must be taken that the content of the oxidative gas does not exceed the equivalent of ammonia because part of ammonia gas will possibly be lost through oxidation in the present step, thus reducing the amount of combined oxygen and the number of cites available for reaction with ammonia. If the gas to be used for the ammonia treatment is one containing carbon dioxide gas, the mixing ratio of carbon dioxide to ammonia should be extremely small. This is to avoid a secondary reaction producing ammonium carbonate. The temperature at which the ammonia reaction is conducted must fall in the range of from 150° C to 700° C, preferably from 400° C to 600° C At a temperature below the lower limit of 150° c, the reaction by which nitrogen is incorporated into the pitch spheres will not appreciably proceed. At a temperature exceeding the upper limit of 700° C, the nitrogen initially bound to the pitch spheres may be released.

The apparatus used for the ammonia treatment in a continuous process may be, a rotary kiln, a fluidized-bed type device or a moving-bed type device. Use of a rotary type pressureproof autoclave is advantageous for a batch process. To ensure that not less than 1.5% by weight of nitrogen will be incorporated into the pitch spheres, it is necessary that the properties (particularly nitrogen content) of the pitch raw material, the content of combined oxygen in the pitch spheres, the particle diameter of the individual pitch spheres, the composition, flow volume and partial pressure of the gas used for the ammonia treatment, the temperature of the system for ammonia treatment, the type of apparatus used for the treatment, etc. be given due consideration.

ACTIVATION

In this step, the pitch spheres containing combined nitrogen are activated at an elevated temperature by a conventional method to produce nitrogencontaining activated carbon spheres having a large inner surface area. As the activating agent, there may be used steam or carbon dioxide or a mixed gas consisting of steam or carbon dioxide and an inert gas. The temperature for the activation is suitably in the range of from 800° C to 1100° C. Where steam or a mixed gas consisting of steam and an inert gas is used, the preferred temperature range is from 850° C to 950° C. Where carbon dioxide or a mixture thereof with an inert gas is used, the temperature for the activation is preferably in the range of from 950° C to 1050° C.

The apparatus used for the activation treatment, may be a device similar to that used for the heat treatment in the presence of ammonia gas.

The activated carbon thus produced will contain at least 1% by weight of combined nitrogen. The activated carbon spheres thus obtained by the present invention have sufficiently high mechanical strength to resist disintegration in the course of normal use. They find utility in diverse applications. Because of their high quality, they prove particularly advantageous for use as activated carbon for removal of sulfur oxides from the exhaust gas, as activated carbon for removal of nitrogen oxides from the exhaust gas, as activated carbon for removal of sulfur oxides and nitrogen oxides simultaneously from the exhaust gas, as catalyst for oxidative decomposition of the COD components contained in waste waters such as sewage or plant effluent and as activated carbon for the treatment of spent sulfite pulp liquor.

The present invention will be described more specifically with reference to preferred embodiments. It should be understood, however, that this invention is not limited in any way to these working examples.

EXAMPLE 1

Preparation of microporous pitch spheres

A stainless steel autoclave fitted with a twisting type stirrer and having an inner volume of 20 liters was charged with 6 kg of pitch produced in the course of dry distillation of coal (made by Tokyo Gas Company, having a softening point of 120° C, an H/C (atomic ratio) of 0.53, a nitrobenzene insoluble content of 12% by weight and a nitrogen content of 0.6% by weight) and 1.5 kg of industrial grade naphthalene. With the autoclave interior purged with nitrogen, the contents were heated at 140° C and agitated at a rate of 100 rpm for 60 minutes to effect thorough blending period. At the end of this blending, 11 kg. of aqueous 0.3% "Gosenol GH-17" (a suspension of partially saponified polyvinyl acetate made by Nippon Gosei Company) solution was admixed with the blend in the autoclave, and the resultant mixture was stirred at 150° C at a rate of 300 rpm for 30 minutes to disperse the mixture as suspended droplets in water. After dispersion, agitation was continued at the same rate and the mixture was, at the same time, cooled rapidly to 30° C to solidify the dispersed pitch-containing particles. Upon separation and removal the product was found to consist of true spheres of naphthalene-containing pitch having an average particle diameter of 0.7 mm.

The minute naphthalene-containing pitch spheres thus produced were contacted with solvent naphtha for five hours for extraction of naphthalene. Numerous micro-pores were formed throughout the minute spheres as a consequence of the removal of naphthalene, giving rise to microporous pitch spheres.

Preparation of activated carbon spheres

A rotary kiln having an inside diameter of 100 mm was charged with 100 g of the microporous pitch spheres. With air delivered at a flow rate of 8 liters/minute, the pitch spheres were oxidized by elevating the temperature of the system from normal room temperature to 300° C at an steady rate of temperature increase. The rate of temperature rise and the oxygen content of the resultant oxidized pitch spheres are shown in Table 1.

The same rotary kiln was charged with 100 g of the oxidized pitch spheres obtained as described above. Then the pitch spheres were subjected to ammonia treatment to cause nitrogen to combine with the oxidized pitch spheres. The composition of the ammonia gas, the flow of the gas, the temperature of the treatment, the length of treatment and the combined nitrogen content of the resultant ammonia-treated oxidized pitch spheres are collectively indicated in Table 1.

The same rotary kiln was charged with 80 g of the ammonia-treated oxidized pitch spheres. The pitch spheres were activated with a 50/50 (by volume ratio) gas mixture of steam and nitrogen or carbon dioxide. The type and composition of the activating gas, the volumetric flow-rate of the gas, the temperature of activation, the length of activation, and the content of combined nitrogen within the activated carbon spheres are all shown in Table 1.

The activated carbon spheres obtained as described above were tested for durability against attrition by placing 20 ml of a sample of activated carbon spheres in a cylindrical glass container (28 mm in diameter × 220 mm in length), rotating the container and its contents about its major axis at a rate of 36 rpm for ten hours and determining the amount of disintegrated activated carbon particles (passing 200-mesh sieve) at the end of the rotation. The results are shown in Table 1.

The capability of the activated carbon to remove $SO_2$ was rated by passing a mixed gas consisting of $SO_2$, $O_2$, $H_2O$ (steam) and $H_2$ at a voluminal ratio of 2 : 6 : 10 : 82 through a bed of activated carbon spheres at 100° C for three hours and determining the amount of $SO_2$ adsorbed on the spheres. The results are shown in Table 1. The ability of the activated carbon spheres to remove nirogen oxides ($NO_x$) was rated in terms of the amount of NO (the least adsorbable of the $NO_x$ group) adsorbed on the spheres. NO was adsorbed under a vapor pressure of 400 mmHg at 30° C for ten hours and the amount of NO adsorbed on the activated carbon spheres was measured. The results are also shown in Table 1.

For purposes of comparison, activated carbons produced under conditions not in accordance with the conditions specified for the present invention and commercially available carbon pellets (for desulfurization of exhaust gas) were similarly tested. The results are given in Table 1 for ready comparison.

TABLE 1 (1)

|  |  | Present invention | | |
|---|---|---|---|---|
|  | Process, Condition and Rating | 1 | 2 | 3 |
| Oxidation | Rate of temperature increase (room temperature to 300° C) (° C/hour) | 15 | 15 | 15 |
|  | Amount of combined oxygen (oxidized pitch) (% by weight) | 18 | 18 | 18 |
| Ammonia treatment | Composition of ammonia gas (by volume) | $NH_3$=100 | $NH_3$=100 | $NH_3$=100 |
|  | Volumetric flow rate (liters/minute) | 1 | 1 | 1 |
|  | Temperature of treatment (° C) | 200 | 500 | 500 |
|  | Period of treatment (hours) | 4 | 4 | 4 |
|  | Amount of combined nitrogen (ammonia-treated pitch) (% by weight) | 2.0 | 2.2 | 2.2 |
| Activation | Composition of activating gas (by volume) | $STM/N_2$=50/50 | $STM/N_2$=50/50 | $CO_2$=100 |
|  | Volumetric flow rate (liters/minute) | 3 | 3 | 1 |
|  | Temperature of activation (° C) | 910 | 900 | 1,000 |
|  | Period of treatment (hours) | 1.5 | 1.5 | 2 |
|  | Amount of combined nitrogen (activated pitch) (% by weight) | 1.0 | 1.2 | 1.2 |
| Rating of quality | Amount of $SO_2$ adsorbed (g/100 g of virgin activated carbon) | 32 | 40 | 40 |
|  | Amount of $SO_2$ adsorbed (g/100 g of activated carbon after used 5 times) | 30 | 39 | 39 |
|  | Amount of NO adsorbed (g/100 g of activated carbon) | 12 | 14 | 14 |

|  |  | Present invention | |
|---|---|---|---|
|  | Process, Condition and Rating | 4 | 5 |
| Oxidation | Rate of temperature increase (room temperature to 300° C) (° C/hour) | 20 | 35 |
|  | Amount of combined oxygen (oxidized pitch) (% by weight) | 15 | 10 |
| Ammonia treatment | Composition of ammonia gas (by volume) | $NH_3$=100 | $NH_3$=100 |
|  | Volumetric flow rate (liters/minute) | 1 | 1 |
|  | Temperature of treatment (° C) | 500 | 500 |
|  | Period of treatment (hours) | 4 | 4 |
|  | Amount of combined nitrogen (ammonia-treated pitch) (% by weight) | 2.1 | 1.7 |
| Activation | Composition of activating gas (by volume) | $STM/N_2$=50/50 | $STM/N_2$=50/50 |
|  | Volumetric flow rate (liters/minute) | 3 | 3 |
|  | Temperature of activation (° C) | 900 | 900 |
|  | Period of treatment (hours) | 1.5 | 1.5 |
|  | Amount of combined nitrogen (activated pitch) (% by weight) | 1.1 | 0.8 |
| Rating of quality | Amount of $SO_2$ adsorbed (g/100 g of virgin activated carbon) | 33 | 26 |
|  | Amount of $SO_2$ adsorbed (g/100 g of activated carbon after used 5 times) | 31 | 24 |
|  | Amount of NO adsorbed (g/100 g of activated carbon) | 12 | 10 |

|  |  | Comparative examples | | | |
|---|---|---|---|---|---|
|  | Process, Condition and Rating | 1' | 2' | 3' | 4' |
| Oxidation | Rate of temperature increase (room temperature to 300° C) (° C/hour) | 15 | 15 | 60 | |
|  | Amount of combined oxygen (oxidized pitch) (% by weight) | 18 | 18 | 7 | |
| Ammonia treatment | Composition of ammonia gas (by volume) | — | — | $NH_3$=100 | $NH_3$=100 |
|  | Volumetric flow rate (liters/minute) | — | — | 1 | 1 |
|  | Temperature of treatment (° C) | — | — | 500 | 700 |
|  | Period of treatment (hours) | — | — | 4 | 4 |
|  | Amount of combined nitrogen (ammonia-treated pitch) (% by weight) | — | — | 1.3 | 0.5 |
| Activation | Composition of activating gas (by volume) | $STM/N_2$=50/50 | $STM/N_2$=50/50 | $STM/N_2$=50/50 | Commercially available carbon pellets |
|  | Volumetric flow rate (liters/minute) | 3 | 3 | 3 | |
|  | Temperature of activation (° C) | 900 | 900 | 900 | |
|  | Period of treatment (hours) | 1.5 | 1.5 | 1.5 | |
|  | Amount of combined nitrogen (activated pitch) (% by weight) | 0.3 | 0.3 | 0.6 | |
| Rating of quality | Amount of $SO_2$ adsorbed (g/100 g of virgin activated carbon) | 8 | 22 | 21 | 19 |
|  | Amount of $SO_2$ adsorbed (g/100 g of activated | | | | |

TABLE 1 (1)-continued

| | | | | |
|---|---|---|---|---|
| carbon after used 5 times) | 6 | 15 | 15 | 11 |
| Amount of NO adsorbed (g/100 g of activated carbon) | 7 | 9 | 9 | 8 |

EXAMPLE 2

A cylindrical reactor 80 mm in inside diameter, provided with a stirrer and, at the bottom, with a raw water inlet and an air inlet and at the top, with an overflow water outlet was used as the apparatus. The water treated was used a spent sulfite pulp liquor which has been filtered for removal of solid matter and then diluted with purified water to adjust the COD value to 150 mg/liter.

50 g of activated carbon was placed in the reactor and stirred at a rate of 200 rpm while the raw water and air were delivered at flow volumes of 100 ml/min. and 500 ml/min. respectively to bring the raw water and air brought into contact with the activated carbon for continuous oxidation of the raw water. In the reactor, 500 ml of raw water was retained with continuous overflow through the overflow outlet. By this procedure, several kinds of activated carbon were tested for their catalytic activity, measured in terms of the COD value of the effluent discharged through the overflow outlet.

In the case of the activated carbon spheres produced in accordance with this invention (equivalent to those involved in Test Runs 2 and 6 of Table 1 of Example 1), the COD values of the respective effluents were 2 mg/liter and trace (<1 mg/liter). In contrast, in the case of the activated carbon produced under comparative conditions (equivalent to that involved in Run 1 of Comparative Test of Table 1), the COD value of the effluent was 65 mg/liter.

What is claimed is:

1. A process for the production of activated carbon spheres, comprising:

melting 100 parts by weight of a pitch in the presence of 10 to 50 parts by weight of naphthalene or tetralin to form a molten mixture;

shaping said molten mixture into the form of spheres;

contacting said spheres with a second solvent, said second solvent being compatible with the aromatic solvent, but lacking affinity for the pitch, to extract said aromatic solvent and to form microporous spheres;

oxidizing said microporous spheres by heating said spheres at a temperature of from 100° C to 400° C in the presence of a gas containing 5-30% by volume oxygen to produce pitch spheres containing at least 10% by weight of combined oxygen; then heating said pitch spheres at a temperature in the range of from 150° C to 700° C in the presence of ammonia to produce pitch spheres having at least 1.5% by weight combined nitrogen; and activating said pitch spheres.

2. The process of claim 1, wherein the oxidative gas is selected from the group consisting of air, oxygen, and mixtures thereof.

3. The process of claim 1, wherein said ammoniacontaining atmosphere is pure ammonia gas or gas mixtures containing ammonia gas in admixture with one or more members selected from the group of steam, air, oxygen, and inert gases.

4. The process of claim 1, wherein the heating in said ammonia-containing atmosphere is carried out at a temperature in the range of from 400° C to 600° C.

5. The process of claim 8 wherein the pitch is melted in the presence of naphthalene.

6. An activated carbon produced by the process of claim 1.

* * * * *